COIN BOX TELEPHONE CIRCUIT

Filed May 9, 1963

Inventor
E. M. HEIRBAUT
By Phillip A. Weiss
Attorney

United States Patent Office 3,296,375

Patented Jan. 3, 1967

3,296,375

COIN BOX TELEPHONE CIRCUIT

Edmond Marie Heirbaut, Antwerp, Belgium, assignor to International Standard Electric Corporation, New York, N.Y., a corporation of Delaware Filed May 9, 1963, Ser. No. 279,166
Claims priority, application Netherlands, May 16, 1962, 278,487
3 Claims. (Cl. 179—6.5)

The present invention relates to a pay stations and more particularly to coin box telephone circuits which are connected to a telephone exchange via a telephone line.

Coin box telephone circuits generally include a dial contact, a coin contact in parallel with the dial contact with a collecting electromagnet which is operated by a reversal of the polarity of said telephone line. Such coin box telephone circuits are well known. In well known coin box telephone circuits a series connection of the said dial contact and a collecting relay bridges said coin contact which is a break contact. Hence, the dial contact is short circuited except when a coin has been inserted in the coin box. While the dial is short-circuited, a dialling operation remains ineffective.

It has been found that the reversal of line polarity may accidentally happen during a dialling operation. Due to this the collecting electromagnet is energized, the coin is collected and the coin break contact is closed thus, practically short-circuiting the dial contact. In this case, further dialling will remain without effect. This is obviously an undesirable situation.

It is therefore an object of the present invention to provide a coin box telephone circuit of the above type wherein the dialling operation is prevented from being disturbed by a polarity reversal of the telephone line.

A related object of this invention is to provide means for preventing said dial contact from being short-circuited before a dialling operation is finished.

A further object of this invention is to provide means for branching the dial contacts in said telephone line in series with a parallel connection of said collecting electromagnet and a first diode which is conductive for the normal line polarity, and that the series connection of said coin contact which is a break contact and a second diode which is conductive for the normal line polarity is coupled in parallel with said dial contact.

In accordance with one embodiment of this invention the coin box telephone circuit is characterized by the fact that the dial contact is in parallel with the break contact of the coin contact which is a change-over contact and that a series circuit is branched across said telephone line, said series circuit being constituted by the make contact of the coin change-over contact, said collecting electromagnet, a diode which is conductive for the reversed line polarity and a gravity switch break contact which is closed when the handset of the subset is in its rest position.

The above mentioned and other objects and features of the invention will become more apparent and the invention itself will be best understood by referring to the following description of embodiments taken in conjunction with the accompanying drawings in which.

Figures 1, 2, 3, 4, 5:
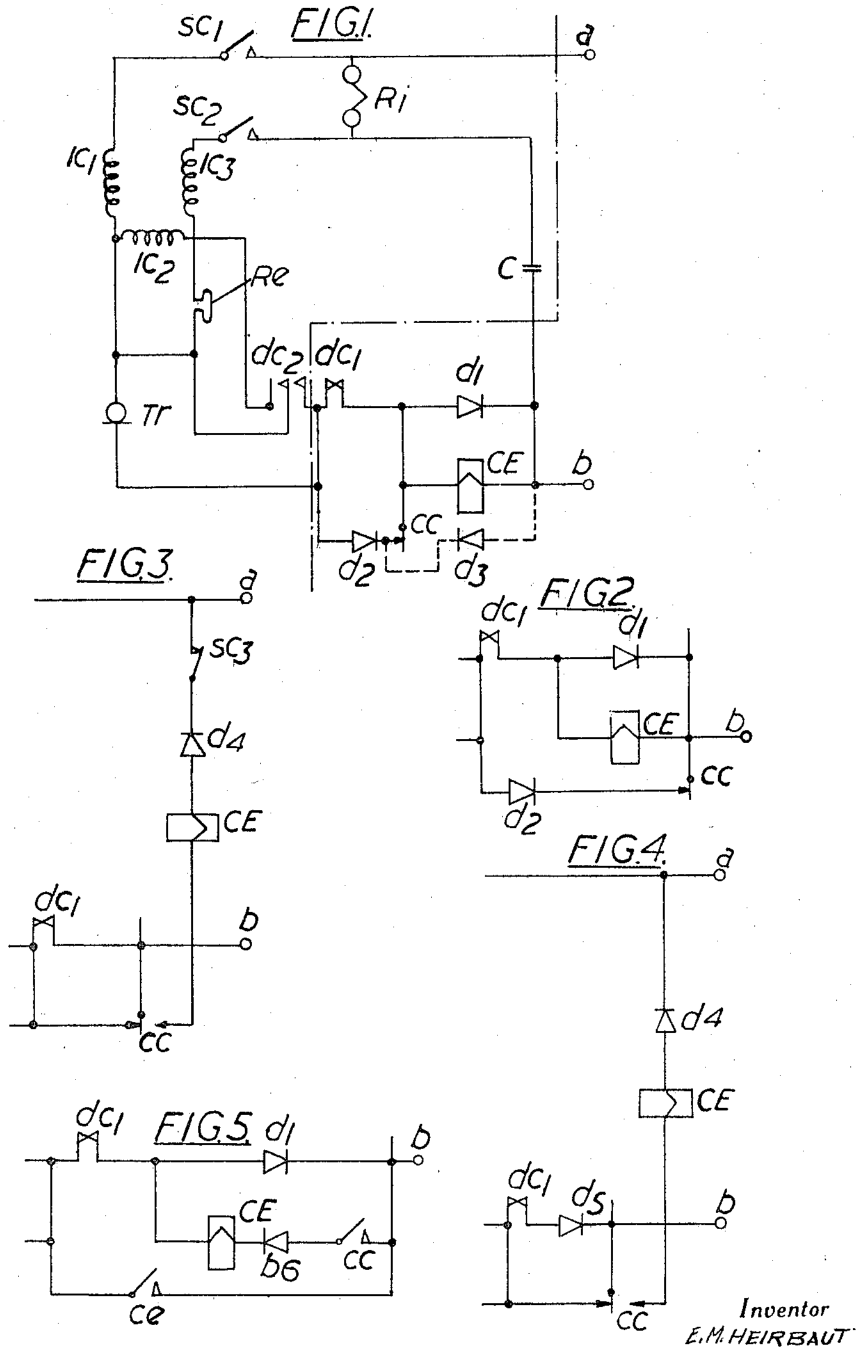
FIG. 1 is a schematic diagram of a first embodiment of a coin box telephone circuit according to the present invention.
FIG. 2 shows a part of a second embodiment of the present coin box telephone circuit.
FIG. 3 represents a part of a third embodiment of the present coin box telephone circuit.
FIG. 4 shows a part of a fourth embodiment of a coin box telephone circuit.
FIG. 5 represents a part of a fifth embodiment of a coin box telephone circuit.

Referring to FIG. 1 there is shown a coin box telephone circuit wherein the reversal of the telephone line polarity occurs when a called subscriber answers.

This coin box circuit is connected to a telephone exchange via the telephone line *a*, *b* and includes the receiver R*e*, the transmitter T*r*, the induction coil $Ic_{1-2-3}$, the ringer $R_i$, the capacitor C, the dial contacts $dc_1$ and $dc_2$ and the hook switch make contacts $sc_1$ and $sc_2$. All these elements are interconnected in the usual manner which is therefore not described in detail. The present invention is only concerned with that part of the coin box circuit shown at the right and below the dashed line.

The dial contact $dc_1$ is branched in the telephone line in series with the parallel connection of a collecting electromagnet CE and a diode $d_1$ which is conductive for the normal line polarity, i.e., the conductors *a* and *b* at a positive and negative potential respectively. On the other hand, the dial contact $dc_1$ is connected in parallel with the series connection of a coin contact *cc* which is a break contact and a diode $d_2$ which is also conductive for the normal line polarity.

The operation of this coin box telephone circuit is as follows. When the handset is removed the hook switch make contacts $sc_1$ and $sc_2$ are closed and the calling subscriber receives dialling tone via the closed hook switch make contact $sc_1$, the induction coil $Ic_1$, the transmitter T*r*, the dial contact $dc_1$, in parallel with the diode $d_2$ and the coin break contact *cc*, and the diode $d_1$. The required fee is then inserted in the coin box. Responsive thereto the coin break contacts *cc* open thus removing the short-circuit from the dial contact $dc_1$ so that dialling is possible. The current then flows from *a* to *b* via the closed hook switch make contacts $sc_1$, the induction coil $Ic_1$, the transmitter T*r*, the dial contact $dc_1$ and the diode $d_1$. It should be noted that the collecting electromagnet CE cannot be energized due to its winding being short-circuited by the conductive diode $d_1$.

If after dialling the called subscriber does not answer, the fee will be mechanically returned in a not shown but well known manner. However, when the called subscriber answers the polarity of the telephone line *a*, *b* is reversed in the exchange, so that the collecting electromagnet CE is energized as follows: conductor *b*, winding of electromagnet CE, dial contact $dc_1$, transmitter T*r*, induction coil $Ic_1$, closed hook switch make contact $sc_1$, conductor *a*.

Responsive to the electromagnet CE being operated, the fee is collected and the coin break contact *cc* is closed again.

If the line polarity is reversed before the dialling operation is finished, the collecting electromagnet CE is operated and the coin break contact *cc* is closed again. However, the dialling operation will not be disturbed due to the presence of the diode $d_2$ which is not conductive for the reversed line polarity.

In the above described coin box telephone circuit the collecting electromagnet CE is only released when the handset is returned to its rest position. This means that the winding of this electromagnet is included in the path followed by the speech current, so that it constitutes a small damping element during the whole conversation. In order to remove such a drawback a diode $d_3$ which is conductive for the reversed line polarity may be connected between the cathodes of the diodes $d_1$ and $d_2$. In this manner, when the fee has been collected, and hence when the coin contact *cc* is again closed, the speech current may flow from conductor *b* to conductor *a* via diode $d_3$, coin break contact *cc*, dial contact $dc_1$, transmitter T*r*, induction coil $Ic_1$, closed gravity switch make contact $sc_1$. The winding of the collecting electromagnet is thus short-circuited so the electromagnet is released.

Instead of connecting the coin break contact *cc* between thes anode of the diode $d_1$ and the cathode of the diode $d_2$ it may also be connected between the cathodes of the diodes $d_1$ and $d_2$. This is shown in FIG. 2. In this case, however, a diode, such as diode $d_3$ cannot be used for short-circuiting the electromagnet CE after the reversed polarity has been applied to the line.

Referring now to FIG. 3 therein is shown a part of a coin box telephone circuit wherein the reversal of the telephone line polarity occurs when the handset is returned to its rest position. In this coin box the dial contact $dc_1$ is branched in the telephone line in parallel with the break contact of a coin contact *cc* which is a change-over contact. A series circuit is further branched across the telephone line *a, b*. It is constituted by the make contact of the coin box changeover contact *cc*, the winding of the collecting electromagnet CE, the diode $d_4$ and the gravity switch break contact $sc_3$ which is closed when the handset is in its rest position. The diode $d_4$ is conductive for the reversed line polarity.

This operation of this coin box circuit is as follows. When the handset is removed the gravity switch make contacts $sc_1$ and $sc_2$ are closed, whereas the gravity break contact $sc_3$ is opened. The calling subscriber receives dialling tone via the closed gravity switch make contact $sc_1$, the induction coil $Ic_1$, the transmitter T*r* and the dial contact $dc_1$ in parallel with the coin break contact. The required fee is then inserted due to which the coin change-over contact *cc* moves to its work position thus, removing the short-circuit from the dial contact $dc_1$. Dialling is thus made possible. The speech current then flows from conductor *a* to conductor *b* via the closed gravity switch make contact $sc_1$, the induction coil $Ic_1$, the transmitter T*r* and the dial contact $dc_1$. It should be noted that the collecting electromagnet CE cannot be energized due to the gravity switch break contact $sc_3$ being open.

When the conversation is finished the calling subscriber brings the handset back in its rest position, thus opening the make contacts $sc_1$ and $sc_2$ and closing the break contact $sc_3$. The polarity of the telephone line, *a, b* is then reversed in the exchange, so that the collecting electromagnet CE is energized as follows: conductor *b*, coin change-over contact *cc* in its work position, winding of electromagnet SE, diode $d_4$, closed gravity switch break contact $sc_3$, conductor *a*.

Since the collecting electromagnet CE can only be operated after conversation, due to the presence of the contact $sc_3$, it is clear that a dialling operation can never be disturbed by a line polarity reversal.

Referring to FIG. 4 there is shown a coin box telephone circuit wherein the fee may be collected after the called subscriber has answered or after the handset has been brought back in its rest position. This circuit only differs from that of FIG. 3 by the absence of the gravity switch break contact $sc_3$ and by the presence of the diode $d_5$ in the line in series with dial contact $dc_1$.

When the line polarity is reversed upon the called subscriber answering the collecting electromagnet is energized by the current which flows as follows: conductor *b*, coin change-over contact *cc* in its work position, winding of electromagnet CE, diode $d_4$, conductor *a*.

The diode $d_5$ is necessary in order to prevent current flow from conductor *b* to conductor *a* via the dial contact $dc_1$, the transmitter T*r*, the induction coil $Ic_1$ and the closed gravity switch makes contact $sc_1$. Since the impedance of the latter circuit is smaller than that of the circuit including the electromagnet CE, the latter electromagnet would not be operated.

When the line polarity is reversed after the handset has been brought back in its rest position, the collecting electromagnet is energized in the same manner as in the preceding case. However, the diode $d_5$ does not play a role since the gravity switch make contacts are open.

Although the coin box telephone circuit just described can be universally used, it should be noted that the dialling operation may be disturbed by a polarity reversal of the telephone line due to the absence of the gravity switch break contact $sc_3$.

Referring to FIG. 5 there is shown another coin box telephone circuit wherein the fee is collected after the called subscriber has answered and by means of which a call can be made to some subscribers without inserting a fee.

When the handset is removed the gravity switch make contacts $sc_1$ and $sc_2$ are closed and the calling subscriber receives dialling tone via $dc_1$ and $d_1$. In the case a paid call has to be made, the required fee is inserted in the coin box due to which the coin make contact *cc* is closed. The number of the subscriber to be called is then dialled and when this subscriber answers the polarity of the telephone line *a, b* is reversed in the exchange so that the collecting electromagnet CE is energized as follows: conductor *b*, closed coin make contact *cc*, diode $d_6$, winding of the collecting electromagnet CE, dial contact $dc_1$, transmitter T*r*, induction coil $Ic_1$, closed gravity switch make contact $sc_1$, conductor *a*.

Due to the electromagnet CE being operated, the fee is collected and the make contact *ce* of this electromagnet is closed and mechanically locked. The coin make contact *cc* is opened again so that the collecting electromagnet CE is released. The speech current now flows via the closed make contact *ce*. The dial contact $dc_1$ is short-circuited by the closed make contact *cc* which is only released when the handset is brought in its rest position so that only then another call can be made.

Apparently, it would be sufficient to branch the make contact *ce* in parallel with the coin contact *cc*. However, in this case it would be possible to make non paid calls to any subscriber after a single paid call has been made. Indeed, when the handset is not brought back to its rest position, the speech path remains closed via the closed make contact *cc* and the closed gravity switch make contacts, whereas, the dial contact is not short-circuited.

In the present circuit, when the number of a subscriber is dialled to which only paid calls can be made and when the required fee has not been inserted the coin make contact *cc* will remain open so that upon the called subscriber answering the polarity of the telephone line is reversed. Since the diode $d_1$ is not conductive for this polarity the connection will then be interrupted.

In the case a non paid call is made to a subscriber to which only such calls may be made the operation is the same as with a normal telephone subset since the line polarity will not be reversed upon the called subscriber answering. The conversation current is then able to flow via dial contact $dc_1$ and diode $d_1$.

While the principles of the invention have been described above in connection with specific apparatus, it is to be clearly understood that this description is made only by way of example and not as a limitation on the scope of the invention.

What is claimed is:

1. A coin box telephone circuit connected to a telephone exchange via a telephone line comprising a dial contact, a coin contact opened responsive to a deposited coin and connected in parallel with said dial contact, to prevent dialling before depositing a coin, a collecting electromagnet coupled in series with said parallel connection and operated responsive to a reversal of the polarity of said telephone line to close said coin contacts and means independent of the operation of said collecting electromagnet for preventing said dial contact from being short-circuited by said coin contacts before dialling is completed.

2. In the coin box telephone circuit of claim 1, wherein said dial contact is in said telephone line in series with a parallel connection comprising said collecting electromagnet bridging a first diode which is conductive for the normal line polarity and, a second diode in series with said coin contact, said series contact of said second diode and said coin contact bridging said dial contact, said second diode is conductive for the normal line polarity.

3. A coin box telephone circuit connected to a telephone exchange via a telephone line, said circuit comprising a dial contact in said line, a coin contact operated to an open condition responsive to a deposited coin and connected to normally short out said dial contact to prevent dialing before the deposit of a coin, a collecting electromagnet operated responsive to a reversal of polarity of said telephone line to close said coin contact, means for connecting said dial contact in series with said collecting electromagnet, first diode conductive with the normal line polarity bridging said collecting electromagnet, second diode conductive with the normal line polarity connected in series with said coin contact across said dial contact, third diode conductive for reversed line polarity connected between the junction point of said second diode and said coin contact and the junction point of said collecting electromagnet and line whereby for the reversed polarity of said line said winding is short-circuited by the series connection of said third diode and said coin contact.

References Cited by the Examiner

UNITED STATES PATENTS

| | | | |
|---|---|---|---|
| 1,349,373 | 8/1920 | Erickson | 179—6.5 |
| 2,066,391 | 1/1937 | Collins et al. | 179—6.5 |
| 2,583,783 | 1/1952 | Lomax et al. | 179—6.3 |

KATHLEEN H. CLAFFY, *Primary Examiner.*

H. ZELLER, *Assistant Examiner.*